US011478992B2

(12) United States Patent
Crane et al.

(10) Patent No.: US 11,478,992 B2
(45) Date of Patent: *Oct. 25, 2022

(54) PROJECTION MATERIAL PROCESSING SYSTEM AND ASSOCIATED METHOD OF USE

(71) Applicant: University of South Florida, Tampa, FL (US)

(72) Inventors: Nathan Brad Crane, Lutz, FL (US); Justin Troy Nussbaum, Knoxville, TN (US)

(73) Assignee: University of South Florida, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/101,924

(22) Filed: Nov. 23, 2020

(65) Prior Publication Data

US 2021/0069979 A1     Mar. 11, 2021

Related U.S. Application Data

(63) Continuation of application No. 15/230,651, filed on Aug. 8, 2016, now Pat. No. 10,843,415.

(60) Provisional application No. 62/202,540, filed on Aug. 7, 2015.

(51) Int. Cl.
| | |
|---|---|
| *B29C 64/268* | (2017.01) |
| *B29C 64/40* | (2017.01) |
| *B33Y 30/00* | (2015.01) |
| *B33Y 40/00* | (2020.01) |
| *B33Y 10/00* | (2015.01) |
| *B33Y 70/00* | (2020.01) |

(52) U.S. Cl.
CPC ............ *B29C 64/40* (2017.08); *B29C 64/268* (2017.08); *B33Y 10/00* (2014.12); *B33Y 30/00* (2014.12); *B33Y 40/00* (2014.12); *B33Y 70/00* (2014.12)

(58) Field of Classification Search
CPC ........ B33Y 10/00; B33Y 30/00; B29C 64/268
See application file for complete search history.

(56) References Cited

U.S. PATENT DOCUMENTS

| | | | |
|---|---|---|---|
| 4,863,538 A | 9/1989 | Deckard | |
| 4,938,816 A | 7/1990 | Beaman et al. | |
| 7,088,432 B2 * | 8/2006 | Zhang | G03F 7/70291 427/512 |

(Continued)

OTHER PUBLICATIONS

Kruth et al., Consolidation phenomena in laser and powder-bed based layered manufacturing. Annals of the CIRP. 2007. vol. 56: 730-759.

(Continued)

*Primary Examiner* — Nathan T Leong
(74) *Attorney, Agent, or Firm* — Meunier Carlin & Curfman LLC

(57) ABSTRACT

A material processing and associated additive manufacturing system and method that utilizes high intensity light to fuse an entire layer of material, at one time, to create a three-dimensional component. The system and method of the present invention allows for each layer to be created in a fraction of the time, thereby reducing the overall time for a three-dimensional component to be created, thereby increasing control over the properties achieved.

5 Claims, 3 Drawing Sheets

(56) References Cited

U.S. PATENT DOCUMENTS

| | | | |
|---|---|---|---|
| 8,383,985 B2* | 2/2013 | Twelves, Jr. | G05B 19/4099 |
| | | | 700/118 |
| 2006/0180957 A1 | 8/2006 | Hopkinson et al. | |
| 2011/0089610 A1* | 4/2011 | El-Siblani | B29C 64/188 |
| | | | 425/89 |
| 2012/0139167 A1 | 6/2012 | Fruth et al. | |
| 2013/0295212 A1 | 11/2013 | Chen et al. | |
| 2014/0314613 A1* | 10/2014 | Hopkinson | B29C 64/295 |
| | | | 264/460 |

OTHER PUBLICATIONS

Levy et al., Rapid Manufacturing and rapid tooling with layer manufacturing {LM} technologies, State of the art and figure perspectives. Annals of the CIRP. 2003. vol. 52: 589-609.

Conley and Marcus. Rapid Prototyping and Solid Free Form Fabrication. Journal of Manufacturing Science and Engineering. 1997. vol. 119: 811-816.

"PT-RZ21KU 3-Chip DLP™ Solid Shine Laser Projector." Panasonic USA, 2022, https://na.panasonic.com/us/audio-video-solutions/projectors/large-venue/pt-rz21ku-3-chip-dlptm-solid-shine-laser-projector.

"Three-chip projectors" in "Digital Light Processing." Wikipedia, Wikimedia Foundation, Jul. 10, 2022, https://en.wikipedia.org/wiki/Digital_Light_Processing#Three-chip_projectors.

* cited by examiner

PROJECTION MATERIAL PROCESSING SYSTEM AND ASSOCIATED METHOD OF USE

CROSS-REFERENCE TO RELATED APPLICATIONS

This invention claims priority to U.S. Provisional Patent Application No. 62/202,540 filed Aug. 7, 2015 entitled "Layerwise Additive Manufacturing Utilizing Dynamic Masks Technology", the content of which is incorporated herein by reference.

BACKGROUND OF THE INVENTION

Additive manufacturing (AM) is an industrial manufacturing method used to create three-dimensional components from solid digital computer models. Typically, the three-dimensional components are sliced into two-dimensional cross sections of a prescribed thickness and each two-dimensional cross section is then reproduced from the feedstock material. These two-dimensional cross sections are stacked on top of each other and fused to the layer beneath, thereby reproducing components with complex three-dimensional geometry. The layering nature of AM allows each part to be unique without requiring custom tooling, but frequently at the cost of fabrication time.

Additive manufacturing (AM) is a rapidly growing field. In addition to prototype manufacturing, the applications for additive manufacturing are expanding into the electronics, medical, aerospace, military and manufacturing industries. The numerous manufacturing requirements in these various industries results in a large variation in the manufacturing process which is dependent upon the specific application and the particular industry. Additive manufacturing is a great candidate for meeting the needs of these various industries because of it's capability to produce parts with complex geometries, utilizing many materials and providing a high degree of customization.

Selective laser sintering (SLS) is an additive manufacturing method which produces high quality parts suitable for end-use. Similar to most other additive manufacturing technologies, SLS forms a complete three-dimensional object by fusing together multiple two-dimensional layers. To form three-dimensional objects with SLS, a focused laser is typically used to impart energy onto a preheated bed of powdered material, which is effective in fusing together the particles of the powdered material in the exposed area defined by the two-dimensional cross section. In SLS, a single area is typically exposed to the laser for milliseconds at a time as a laser scans across the two-dimensional cross section of the part to be created. A new layer of powdered material is then deposited on top of the first sintered two-dimensional cross section and the process repeats, as shown in FIG. 1.

Prior art methods known in the art for creating a component utilizing additive manufacturing, such as selective layer sintering, are time consuming.

Accordingly, what is needed in the art is a system and method that reduces the time required to create a component using additive manufacturing.

SUMMARY OF THE INVENTION

In various embodiments, the present invention provides a system and method for dynamically processing of one or more layers of material utilizing a projection system that is sufficient to simultaneously process a large surface area of the material layer. In a particular embodiment, the material processing system is a sintering system which reduces the time required to create a component using additive manufacturing.

In one embodiment, the present invention provides a material processing system which includes, a platform for supporting a layer of material and at least one image projector, wherein the at least one image projector further includes, a light source, a digital light switch to modulate the light source based upon a digital signal to produce at least one image, at least one lens coupled to the digital light switch. In the projection system of the present invention the at least one image projector is configured to project the at least one image through the at least one lens and onto a surface area of the layer of material, wherein an intensity of the at least one image induces a temperature change in select regions of the layer of material that is sufficient to cause a change in one or more physical properties of the material. Various possible changes may include a change of phase, as from a liquid to a solid or a solid to a liquid, or a change in connectivity, as from a powder state to an agglomerate state or to a solid state. The material process system may also cause a phase change of liquid to gas or even solid to gas if the projector is powerful enough. Other physical property changes may include changes in thermal properties, such as thermal conductivity, diffusivity, and emissivity. Changes in physical properties of the material, such as density, volume and molecule mass may also occur as a result of the material processing in accordance with the present invention. In addition, controlling the characteristics of the thermal processing, allows for control and fine tuning of the strength, Young's modulus and elongation to failure of the components resulting from the material processing system In a particular embodiment, the digital light switch may be a digital light processing (DlY) chip comprising a digital micromirror device (DMD) and the layer of material may be powder that absorbs light at one or more wavelengths of light of the light source.

In an additional embodiment, the projection material processing system of the present invention may include a thermally controlled chamber, to pre-heat the material on the platform to a desired pre-heated temperature prior to projecting the image onto the material to heat the layer of material. The projection system may also include a thermal imaging camera positioned over the platform and a temperature feedback control system coupled to the thermal imaging camera and the digital light switch for controlling digital light switch in response to the spatial temperature of the layer of material.

In a specific embodiment, the projection material processing system of the present invention may be utilized as an additive manufacturing system and the system may include a platform for supporting a plurality of layers of sinterable material, a material depositing mechanism for depositing the plurality of layers of sinterable material, one layer at a time, onto the platform and at least one image projector. In the additive manufacturing system, the at least one image projector further includes a light source, a digital light switch to modulate the light source based upon a digital signal to produce at least one image, at least one lens coupled to the digital light switch and the at least one image projector is configured to project the at least one image through the at least one lens and onto a surface area of the layer of sinterable material, one layer at a time, wherein an intensity of the at least one image induces a temperature change in the layer of material that is sufficient to cause a change in one or more physical properties of the material.

The present invention further provides a method for inducing a change in at least one physical property of a layer of material, wherein the method includes providing a layer of material on a platform and projecting at least one image from an image projector onto a surface area of the layer of material, wherein an intensity of the at least one image is sufficient to heat the layer of material to induce a temperature change in the layer of material that is sufficient to cause a change in one or more physical properties of the material. In a specific embodiment for use in additive manufacturing, the method may further include, depositing a plurality of layers of sinterable material, one layer at a time, onto the platform and projecting at least one image from an image projector onto a surface area of the layer of sinterable material, one layer at a time, wherein an intensity of the at least one image is sufficient to heat the layer of sinterable material to a desired temperature that is sufficient to result in sintering of the material. The plurality of layers, once sintered by the projection system of the present invention, thereby forming a three-dimensional object.

The material processing system and associated additive manufacturing technology of the present invention utilizes high intensity light to fuse an entire layer of material at one time, rather than fusing a single scanning point, as is common in most of the existing fusion based additive manufacturing technologies currently known in the art. The system and method of the present invention allows each layer to be created in a fraction of the time required in the prior art selective layer sintering process (SLS), thereby reducing the overall time for a three-dimensional component to be created.

Additionally, the system and method of the present invention allows each layer to be heated for a longer period of time, as compared to SLS, thereby enabling a greater degree of sintering to be attained in the material. The technology of the present invention allows for similar geometric freedoms as conventional additive manufacturing and allows for additional optimization of the manufacturing process.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

The layerwise additive manufacturing dynamic mask methodologies of the present invention are capable of fusing an entire layer of heated powder at one time inside a thermally controlled chamber.

Figure 1:
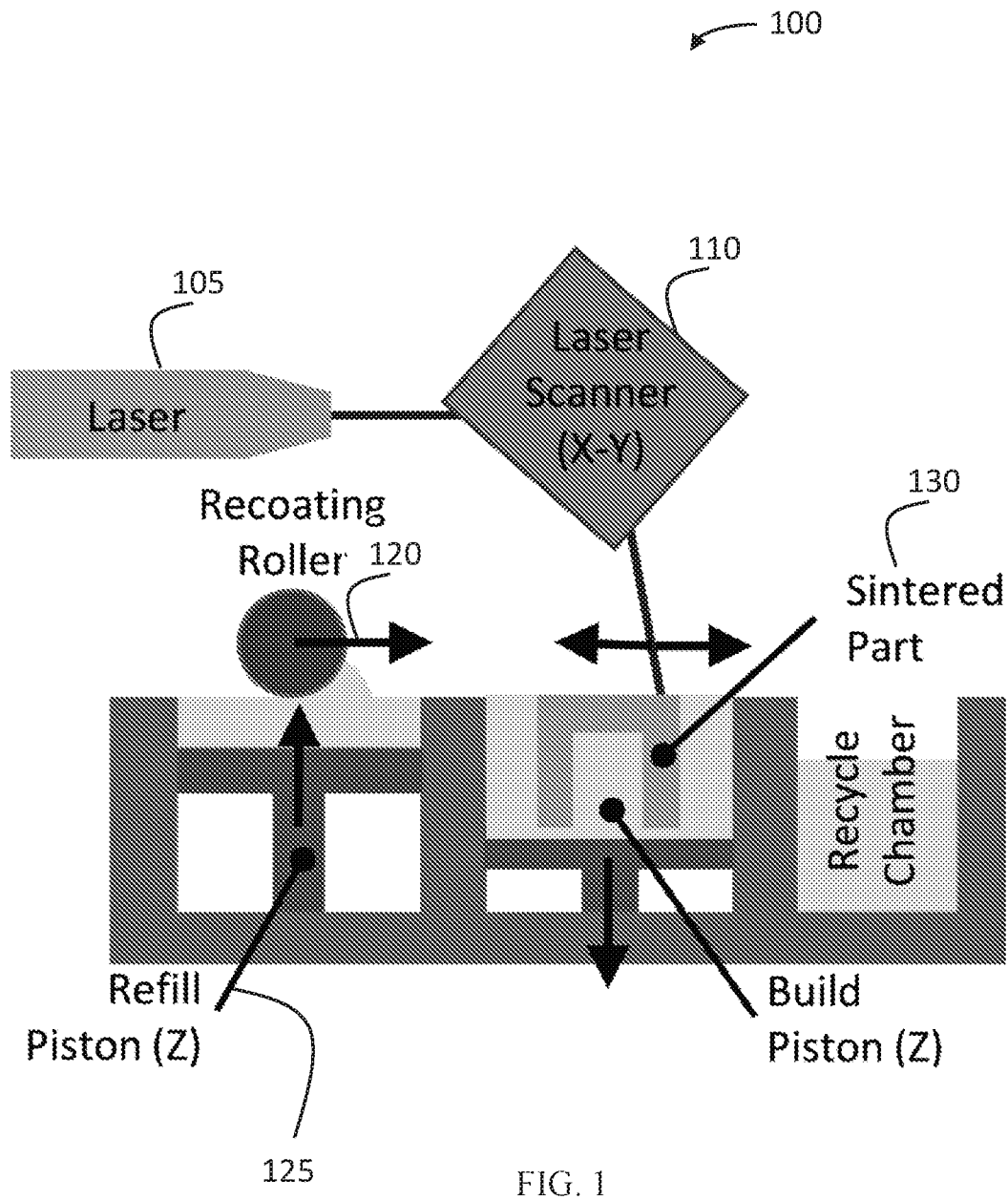
FIG. 1 is a diagrammatic view of a prior art selective layer sintering (SLS) manufacturing system and method.

As shown in FIG. 1, a typical industrial SLS system 100 includes a high power laser 105, a galvanometer 110 for steering the laser 105 and a powder spreading system 120, 125 contained within a closed inert environment. During the SLS process, the laser 105 and laser scanner 110 sinters the powder in the X-Y axis while the recoating roller 120 and refill piston 125 supplies powder to a new layer. Industrial SLS systems 100 are relatively expensive and complex, thereby rendering the system out of range for most users. In order to produce parts 130 economically and with high spatial resolution; commercial SLS systems generally incorporate a small diameter laser (~0.5 mm) with a high scanning speed (~5 m/s) to accomplish the sintering of the powdered material.

In traditional selective laser sintering (SLS), during the few milliseconds of exposure to the sintering laser, the powder particles are brought well above their melting temperature, which requires high heating rates. In the case of plastics, high heating rates and temperatures can cause sensitive materials to degrade, as some parts of the material will be significantly hotter than others. Additionally, the best SLS materials are partially crystalline with a well-defined melting point. The crystalline nature of the SLS materials allows the powder to be preheated near the melting point without the powder bed fusing together which reduces the difficulty in spreading new uniform layers of powder. Furthermore, the material used in SLS should have minimal degradation during transient heating or under prolonged preheating in the powder bed. Part distortion can also be reduced if the crystallization temperature is well below the melting point. In order to meet these requirements for SLS, nylon is currently one of a few select materials which have properties that make it suitable for selective laser sintering. As such, the vast majority of materials used for SLS are nylons or nylon-based, in order to meet these constraints.

As discussed, high temperatures and heating rates can degrade some polymeric materials. Chain scission and oxidation can damage polymer chains and reduce performance by affecting chain molecular weight and stability. Additionally, post condensation reactions in the bulk phase at elevated temperatures can cause increases in the molecular weight in unmodified polyamide nylon), thus affecting melt viscosity and sintering efficacy.

Polymer sintering typically occurs through a viscous sintering process, wherein a two stage process includes the coalescence of powder particles followed by porosity shrinkage and removal. The early phases of the sintering process can be described by a simple viscous sintering model, wherein liquid phase sintering is driven by surface tension forces which attempts to minimize surface energy by reducing the surface area. As viscosity is a measure of the resistance to flow, in order to fully fuse and coalesce these particles, the polymer must have sufficiently low viscosity to allow the material to flow over the required sintering time. Low strength components with high porosity will result if viscosities are too high or heating times are too short during sintering. During the transition from solid to liquid, the viscosity drastically decreases, allowing the material to flow. In the simple viscous sintering model below, it becomes evident that the zero shear viscosity has a large impact in sintering coalescence by:

$$\frac{x}{r} = \left(\frac{3\gamma}{2\eta_0 r}\right)^{1/2} t^{1/2} \quad (1)$$

Where x is the joint length of particle coalescence relative to the original radius (r), $\gamma$ is the surface tension, $\eta_0$ is the zero shear viscosity and t is the sintering time. The sintering rate is determined by the material viscosity. Specifically, the zero shear rate is typically most relevant because the low speeds experienced during sintering create minimal shear stresses. Zero shear viscosity is proportional to the weight averaged molecular weight and is therefore sensitive to the effects of post condensation reactions that increase the molecular weight. However, the low exposure time and high heating rates in SLS results in highly transient, position-dependent temperatures. This makes it is difficult to control the viscosity in-situ or to tune the process conditions to the material properties. For laser sintering the easiest way of modifying the zero shear viscosity is by adjusting the molecular weight of the material. Furthermore, the molecular weight is an intrinsic material property, which increases over time during the preheat and sintering stages, making in-situ control of this property particularly difficult.

In contrast with the SLS systems currently known in the art, the material processing system of the present invention provides a lower initial cost and is capable of selectively sintering an entire region or even layer of powder in a single exposure utilizing a high power projection system. Additionally, in contrast with SLS techniques known in the art, in the proposed material processing system, the powder is sintered over the course of a few seconds, instead of a few milliseconds, thereby allowing sufficient time for in-situ monitoring and control systems to be implemented. The incorporation of monitoring and control systems improves the quality of the resulting components by ensuring that every location within the material layer has been heated in accordance with the correct thermal profile.

In various embodiments, the material processing system of the present invention includes a platform for supporting a layer of material and at least one image projector, where the at least one image projector further includes, a light source, a digital light switch to modulate the light source based upon a digital signal to produce at least one image, at least one lens coupled to the digital light switch. In the material processing system of the present invention, the at least one image projector is configured to project the at least one image through the at least one lens and onto a surface area of the layer of material, wherein an intensity of the at least one image is sufficient to heat the layer of material to a desired temperature. In various embodiments, the desired temperature is a temperature that is sufficient to cause a change in the physical properties of the material. Various possible changes may include a change of phase, as from a liquid to a solid or a solid to a liquid, or a change in connectivity, as from a powder state to an agglomerate state or to a solid state.

Figure 2:
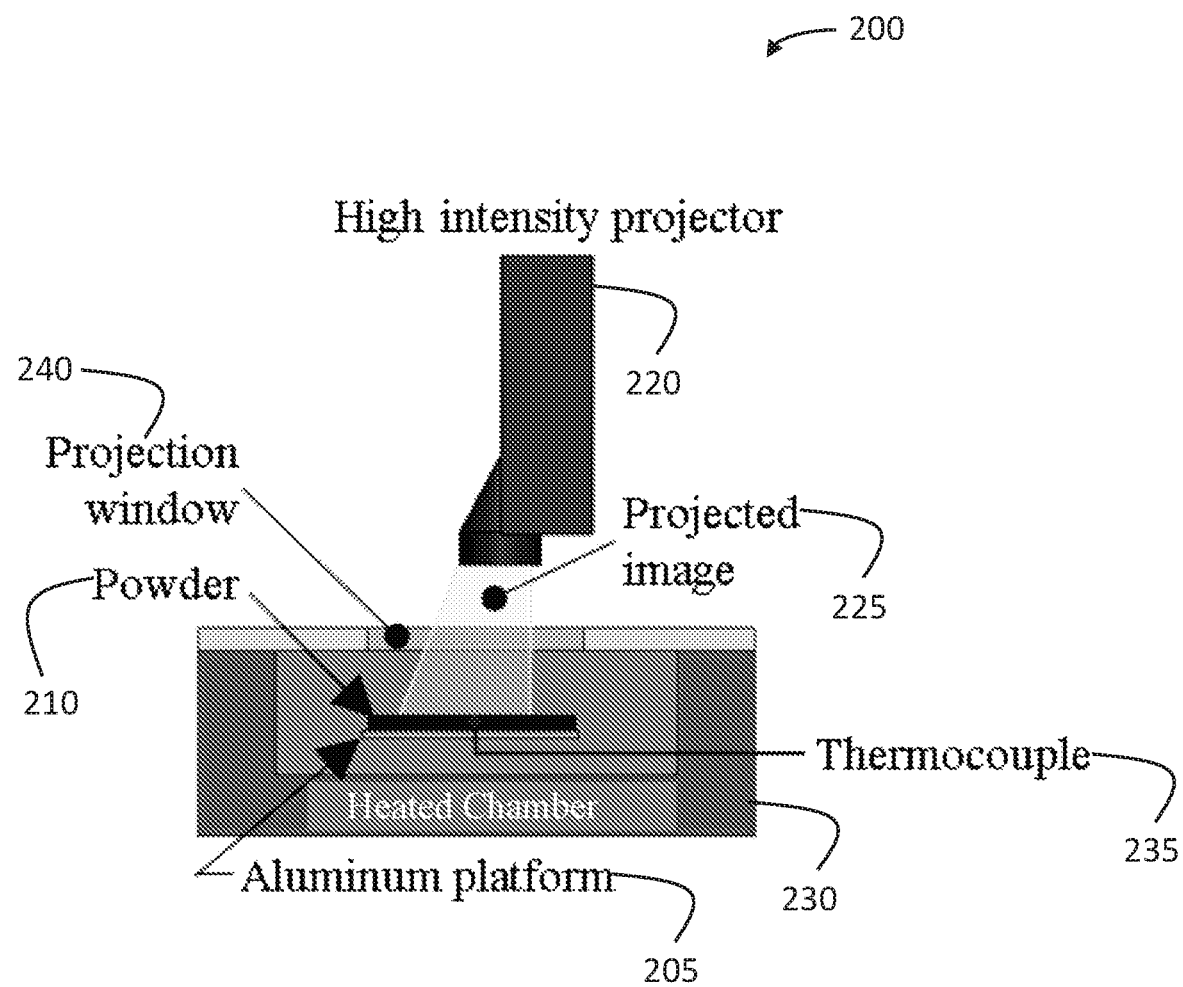
FIG. 2 is a diagrammatic view of a material processing system incorporating a material temperature measurement sensor, in accordance with an embodiment of the present invention.

With reference to FIG. 2, a system 200 for processing single layered parts with a single large selective area exposure in accordance with the present invention is provided, which includes a platform 205 for supporting a material 210 to be processed and a high intensity projector 215 for projecting an image 225 onto the surface of the material 210. In this embodiment, the high intensity projector 215 includes a digital light switch which is fed by a light source and a lens. In the projected image 225, white pixels represent areas which will receive the maximum light exposure, while black pixels will receive the least amount of intensity. Depending upon the level of gray scale, varying levels of power can be projected onto the powdered material 210 from the projector 215 using the projected image 225. The system may further include a heated chamber 230 to preheat the powdered material 210 prior to exposing the material 210 to the light from the projector 215. The light from the projector 220 may be provided through a projection window 240 positioned over the material 210. The system may further include a thermocouple or other temperature measurement device 235, such as a pyrometer to measure the surface temperature from a distance or a thermistor which could be positioned within the material 210 to measure the temperature of the material 210 during the process. In the present invention, a blade may be used to spread new uniformly smooth layers of the material 210 over an aluminum platform 205. In one embodiment of the present invention, the high intensity projector 220 provides a concentrated 7.3 W of optical power onto a 3.7 $cm^2$ exposure area. As such, the projection system 200 in capable of exposing an entire layer of material simultaneously over the course of a few seconds. This method allows for longer exposure times without compromising the overall build time, which enable improved properties for processing of a wider variety of materials relate to a laser scanning method.

Figure 3:
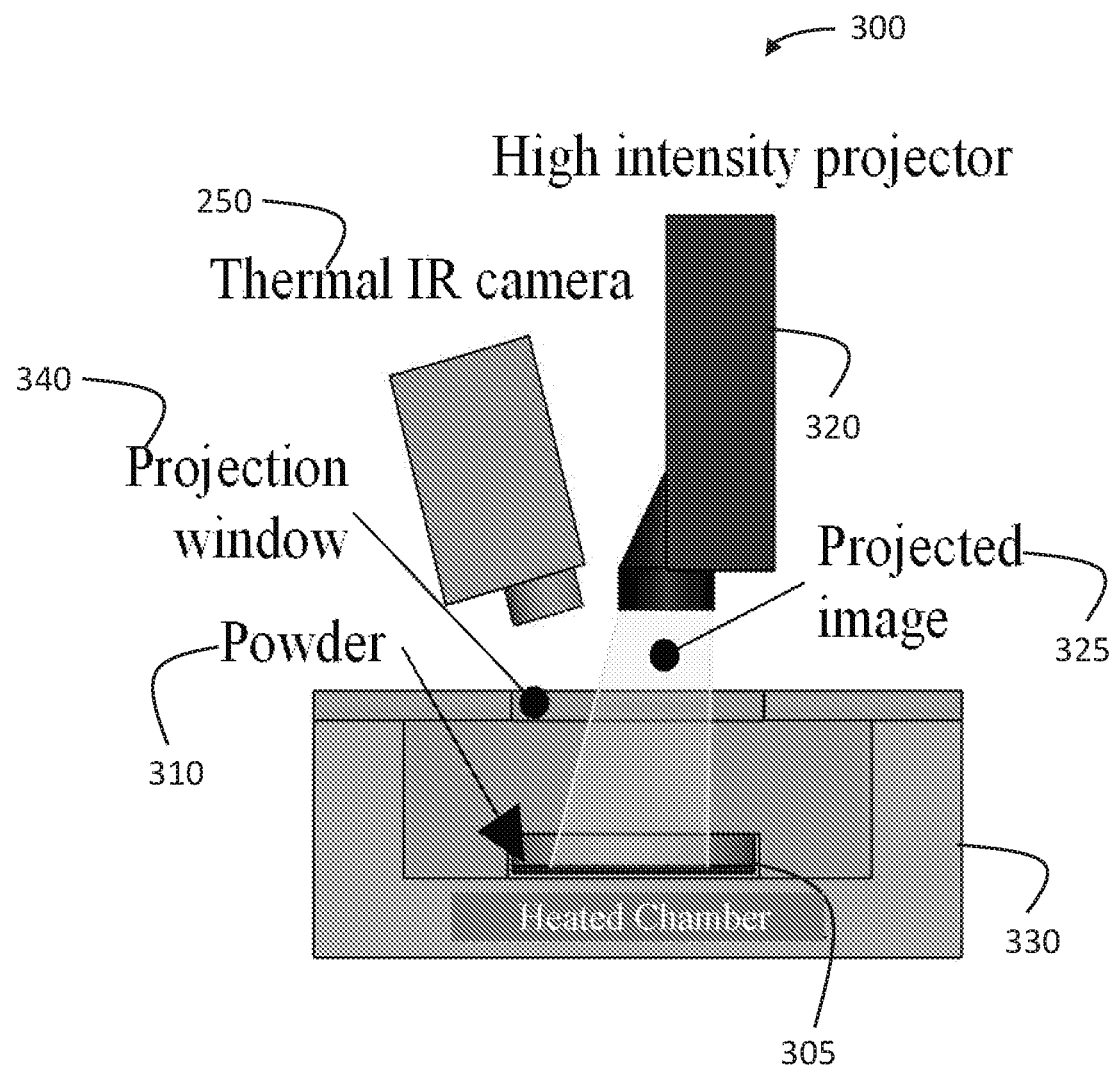
FIG. 3 is a diagrammatic view of a material processing system incorporating a thermal camera, in accordance with an embodiment of the present invention.

With reference to FIG. 3, in an additional embodiment, the invention may further include a thermal camera 350 to provide temperature feedback for the thermal feedback mechanism. As shown in FIG. 3, a system 300 for processing single layered parts with a single large selective area exposure in accordance with the present invention is provided, which includes a platform 305 for supporting a material 310 to be processed and a high intensity projector 315 for projecting an image 325 onto the surface of the material 310. In this embodiment, the high intensity projector 315 includes a digital light switch which is fed by a light source and a lens. The system further includes a thermal camera 350 positioned to collect thermal data from the surface of the material 310. In various embodiments, the thermocouples, pyrometers, and thermistors may also used to complement or calibrate the thermal camera 350 since it can be sensitive to multiple types of error.

In a particular embodiment the digital light switch is a digital light processing (DLP) chip comprising a digital micromirror device (DMD). The DLP chip is known as comprising a rectangular array of up to 8.8 million hinge-mounted microscopic mirrors. The DLP chip, coordinated with a digital video or digital graphic signal, controls the micro-mirrors by tilting them either toward the light source in an ON state or away from the light source in an OFF, thereby creating a light or dark pixel on the projection surface.

A DLP projection system typically includes a color wheel which filters the light from the light source into red, green blue, and occasionally other colors as well. As such, the color wheel lowers the intensity of light through each of the filters. In accordance with the present invention, by removing the color wheel from the projector light path, the light becomes a continuous high intensity light which can be manipulated by the DLP chip to be either ON, OFF or a combination of the two, resulting in a gray scaled image. Removing the color wheel eliminates the need for a mask and even enhances the current masking technology by allowing gray scaled areas.

Eventually, a limit will be reached where an individual DLP chip can no longer withstand a higher light intensity. In order to continue to use the DLP chip to cure larger areas and/or to cure higher temperature materials, the intensity of the light must be increased. To increase the intensity of the light, multiple DLP chips can be used and the light columns from each of the DLP chips can be combined together to increase the light intensity of the projector. If the intensity of the light cannot be increased, procedures such as "step and repeat," surface scanning or the projection of adjacent images from multiple projectors may be incorporated. In the case of step and repeat, the platform supporting the material may stepped in x and y directions to sequentially expose reduced images of the original image on different areas of the material surface.

In a particular embodiment, a plurality of image projectors may be used to simultaneously project different images onto different surface areas of the layer of material, thereby increasing the processed area. In addition, the image may be comprised of a plurality of partial images and the image projector may be controlled to project each of the partial images onto a different surface area of the layer of material, thereby forming a complete image.

While the DLP technology has been demonstrated as one possible implementation path, it is considered to be within the scope of the present invention to utilize other means of creating a dynamic optical mask in accordance with the present invention.

In the present invention, since the DLP chip will now be withstanding higher light intensities, the temperature and temperature gradient of the DLP chip must be monitored and kept within its thermal operational range to prevent damage to the chip. In one embodiment, the DLP chip is kept from overheating by inserting a mechanical shutter in the light path between the projector bulb and the DLP chip. Since the projector bulb can't be pulsed, or turned ON and OFF repeatedly, the shutter provides a mechanical means of interrupting the light path between the bulb and the DLP chip. The shutter allows the user to control how much light reaches the DLP chip and therefore how much the DLP chip is heated. This shutter actuation method can also be used to create grey scaled images.

In one embodiment of the present invention, the light from the DLP projection system may be used to fuse an entire layer of powder together at one time. Similar to selective laser sintering (SLS), as a layer is completed, another layer of powder is deposited on top of the previous layer, either by a blade, a roller mechanism or some other uniform powder spreading technique and the process is repeated until a complete component is formed.

In the present invention, the projector utilized to perform the dynamic mask layerwise additive manufacturing of the present invention differs from a standard projector, wherein the projector of the present invention maximizes the thermal energy radiated from the projector bulb. In a particular embodiment, maximizing the thermal energy is achieved by omitting the standard color wheel and changing the optic elements so that the size of the projected light is only slightly increased to be equal to the size of the powder bed, rather than being equal to the size of a projector viewing screen. In a particular embodiment, an off-the-shelf projector can be modified to decrease the exposure area from a maximum of 278,709 $cm^2$ to 3.7 $cm^2$. Since the maximum optical power (W) is fixed and is independent of the screen size, decreasing the screen size increases the power density (W/$cm^2$). Additionally, the optical power can be boosted from 1.8 W to 7.3 W, measured from a fully while projected image on a thermal power sensor, thereby providing an overall power density increase from $6.5 \times 10^{-6}$ W/$cm^2$ to 1.97 W/$cm^2$, which is representative of an increase of more than 30,0000%.

In a particular embodiment, the projector's optical power may be provided by a 190 W ultra-high pressure mercury vapor (UHP) bulb. WV bulbs produce a broad spectrum of light that ranges from the ultra violet (UV) to infrared (IR) spectrum. A majority of the energy from UHP bulbs is contained within the visible spectrum (400-800 nm) and produces a mostly white light. The absorption of visible light is strongly connected to the color of the absorbing material. As such, white materials reflect most of the visible light away from the surface, absorbing only a small portion of the optical energy from the light. This is in contrast with the present SLS systems which use a CO, laser operating in the IR spectrum at 10.6 µm, where energy absorbance is not heavily color dependent, as is the case with visible light. In a particular embodiment, the powder is a dark gray nylon 12 powder (PA2202) which, upon melting, becomes evenly black as the black pigment (carbon black) evenly disperses throughout the component. PA2202 is manufactured for the SLS industry and is commonly used in SLS systems to create black components.

Stereolithography (SLA) systems are known in the art, which utilize a laser or a digital light processing (DLP) device, operating within the UV range, to activate a photopolymerization reaction which cross-links a liquid photopolymer to make a solid object. The components resulting from SLA system are weak and brittle, rendering this process mostly acceptable for prototyping applications. In contrast, in the projection system used for material processing in accordance with the present invention, light within the visible and IR spectrum is used to create solid parts which exhibit high strength. In the present invention, the intensity of the light is high enough to cause sufficient heating of the material in order to change a solid powdered material into a liquid state. The liquefied state of the material densities and then allowed to return to a solid state, thereby creating parts that exhibit a high strength and can be used directly as components in a larger mechanical system. In various embodiments, the high intensity light source of the projected light is obtained through the use of high power sources.

Slower sintering can allow for lower peak temperatures and avoid degradation and/or increased sintering time for more complete densification of materials with slower than typical densification rates during sintering. This could increase the range of polymers that can be processed via the sintering system, achieve higher quality materials and improve recyclability by reducing degradation. Additionally, different exposure times and/or light intensities at different location can vary the spatial properties of the final produce. The present invention can improve layer processing speed for some materials and for slow sintering materials, can dramatically reduce the build rate penalty of slow sintering. The layer of material may be in the form of a powder that absorbs light at one or more wavelengths of light of the light source. In an additional embodiment, the material may further include an absorber that absorbs light at one or more wavelengths of light of the light source. Various absorbers could be added globally by premixing into the powder, or locally, such as through inkjet printing, to help control the absorption areas of the layer of sinterable material. In a particular embodiment, the powdered material 210 is a polymer powder and the aluminum platform 205 holds a 1.5 mm layer of the polymer powder at a preheat temperature in the heated chamber 230. In this embodiment, a thermocouple 235 is placed in the center of the powder 210 and is used to control the proper preheat temperature while the high intensity projector 220 exposes and sinters the polymer powder 210 through a borosilicate glass window 240. In a particular embodiment, the preheat temperature was maintained at 170° C. By preheating the powder to just under the melting temperature, less optical energy from the projector 220 is required to melt the powder 210 and the internal stresses, which can lead to warping, can be reduced.

The heated chamber 230, or other thermally controlled chamber, may be used to pre-heat the material to a desired pre-heated temperature prior to projecting the image from the image projector onto the material, thereby reducing the energy requirement for the laser projector. In various embodiments, the interior of the heated chamber 230 is subjected to standard atmospheric conditions, rather than an inert nitrogen environment, as is typical in SLS systems.

The projection based material processing system of the present invention can potentially expand the capable materials in the sintering field beyond the commonly used nylon. The inventive system may aid in the understanding of sintering kinetics outside the realm of high heating rates, thereby creating a system capable of creating 3D printed parts. The present invention is very modular and scalable and additional, or higher powered, projectors could be used to sinter with higher heating rates or larger areas. Fast refresh rates of projectors also allows for dynamic control over spatial temperature distributions within the exposure area.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for processing a layer of a powdered material, the method comprising:
   providing a powdered material; and
   projecting at least one image from an image projector onto a surface area of the powdered material, with an exposure area of 3.7 $cm^2$ to 278,709 $cm^2$, wherein an intensity of the at least one image induces a temperature change in the powdered material that is sufficient to cause a change in one or more physical properties of the powdered material; wherein to increase light intensity:
   i) the image projector comprises a light source and a plurality of digital light switches and wherein a light column from each of the digital light switches is combined together to increase a light intensity of the image projector; and/or
   ii) the method comprises a step of surface scanning or projection of adjacent images from two or more image projectors; wherein the surface scanning or projection is achieved by moving a platform supporting the powdered material in x and y directions to sequentially expose reduced images of at least one image on different areas of a surface of the powdered material.

2. The method of claim 1, wherein projecting the at least one image from the image projector onto the surface area of the powdered material further comprises:
   projecting the at least one image through at least one lens and onto the surface area of the powdered material.

3. The method of claim 1, further comprising pre-heating the powdered material to a desired pre-heated temperature prior to projecting the at least one image from the image projector onto the surface of the powdered material.

4. The method of claim 1, further comprising;
   measuring a spatial temperature of the surface of the powdered material, and
   controlling the digital light switch based upon the measured spatial temperature of the surface of the powdered material.

5. The method of claim 1, further comprising:
   depositing a plurality of layers of powdered material, one layer at a time, onto the platform; and
   projecting the at least one image from the image projector onto the surface area of the powdered material, one layer at a time, wherein an intensity of the at least one image induces a temperature change in the layer of powdered material that is sufficient to cause a change in one or more physical properties of the powdered material.

* * * * *